United States Patent
Satori et al.

[19]

[11] Patent Number: 5,967,500

[45] Date of Patent: Oct. 19, 1999

[54] ANTIVIBRATION RUBBER DEVICE

[75] Inventors: Kazutoshi Satori; Osamu Maruyama, both of Saitama, Japan

[73] Assignee: Yamashita Rubber Kabushiki Kaisha, Saitama, Japan

[21] Appl. No.: 08/997,851

[22] Filed: Dec. 24, 1997

Related U.S. Application Data

[63] Continuation of application No. 08/905,335, Aug. 4, 1997, Pat. No. 5,772,189, which is a continuation of application No. 08/490,743, Jun. 15, 1995, abandoned.

[30] Foreign Application Priority Data

| Mar. 1, 1994 | [JP] | Japan | 6-56714 |
| Mar. 1, 1994 | [JP] | Japan | 6-56715 |
| Mar. 1, 1995 | [JP] | Japan | 7-66738 |

[51] Int. Cl.$^6$ ........................................ F16F 5/00
[52] U.S. Cl. ............... 267/140.13; 248/562; 267/219
[58] Field of Search ................ 267/140.11–141.7, 267/219; 248/562, 636, 638; 180/300, 312

[56] References Cited

U.S. PATENT DOCUMENTS

| 4,159,091 | 6/1979 | Le Salver et al. . |
| 4,215,842 | 8/1980 | Brenner et al. . |
| 4,568,069 | 2/1986 | Poupard . |
| 4,607,828 | 8/1986 | Bodin et al. . |
| 4,610,421 | 9/1986 | Ohta et al. . |

(List continued on next page.)

FOREIGN PATENT DOCUMENTS

| 0042910 | 3/1981 | European Pat. Off. . | |
| 0156697 | 2/1985 | European Pat. Off. . | |
| 0205657 | 11/1985 | European Pat. Off. . | |
| 0212143 | 6/1986 | European Pat. Off. . | |
| 0231898 | 1/1987 | European Pat. Off. . | |
| 232892 | 8/1987 | European Pat. Off. | 267/140.13 |
| 0265681 | 5/1988 | European Pat. Off. . | |
| 0331951 | 2/1989 | European Pat. Off. . | |
| 0565860 | 3/1989 | European Pat. Off. . | |
| 0527302 | 6/1992 | European Pat. Off. . | |
| 3829021 | 8/1988 | Germany . | |
| 4036517 | 5/1992 | Germany | 267/140.13 |
| 62-184254 | 2/1987 | Japan . | |
| 215143 | 9/1987 | Japan | 267/140.13 |
| 64-1566 | 1/1989 | Japan . | |
| 1-229131 | 9/1989 | Japan . | |
| 3-46035 | 4/1991 | Japan . | |
| 3-168439 | 7/1991 | Japan . | |
| 4194429 | 7/1992 | Japan | 267/140.13 |
| 5-17415 | 3/1993 | Japan . | |
| 5-172180 | 7/1993 | Japan . | |
| 7-71508 | 3/1995 | Japan . | |
| 2041485 | 9/1980 | United Kingdom . | |
| 2206176 | 12/1988 | United Kingdom | 267/140.13 |
| WO88/03236 | 5/1988 | WIPO . | |

OTHER PUBLICATIONS

U.S. Patent Appln. SN 06/825,500 Marjoram filed Feb. 3, 1986.

Patent Abstracts of Japan, vol. 14, No. 364 (M–1007) Aug. 7, 1990, JP2129426.

*Primary Examiner*—Chris Schwartz
*Attorney, Agent, or Firm*—Birch, Stewart, Kolasch & Birch, LLP

[57] ABSTRACT

An orifice plate is projectingly provided within a fluid chamber formed inside an elastic block to damp the medium to high frequency vibrations. The orifice plate is arranged to have a projection area which is maximum in the principal input direction Z of vibrations to be isolated, medium in the direction Y of the two input directions X and Y which are perpendicular to the direction Z, and minimum in the direction X by providing a recess at a bottom thereof which traverses in the same direction (as the direction X). The resonance frequency is high in the direction Y and the circumferential edge portions of the projection surface in the direction Y are adapted to serve as stoppers which perform the displacement control in the direction X. In another embodiment, the stoppers are asymmetrically shaped.

14 Claims, 13 Drawing Sheets

U.S. PATENT DOCUMENTS

| | | | |
|---|---|---|---|
| 4,648,576 | 3/1987 | Matsui . | |
| 4,660,812 | 4/1987 | Dan et al. . | |
| 4,709,779 | 12/1987 | Takehara . | |
| 4,720,086 | 1/1988 | Le Salver et al. . | |
| 4,762,309 | 8/1988 | Hutchins . | |
| 4,765,601 | 8/1988 | Miller et al. . | |
| 4,802,648 | 2/1989 | Decker et al. . | |
| 4,815,720 | 3/1989 | Vanessi . | |
| 4,834,350 | 5/1989 | de Fontenay | 267/140.13 |
| 4,858,896 | 8/1989 | Colford | 267/140.13 |
| 4,872,652 | 10/1989 | Rohner et al. . | |
| 4,877,225 | 10/1989 | Noguchi et al. . | |
| 4,886,252 | 12/1989 | Häussermann . | |
| 4,905,955 | 3/1990 | Brizzolesi et al. | 267/140.13 |
| 5,104,100 | 4/1992 | Simuttis . | |
| 5,129,479 | 7/1992 | Fujii et al. | 180/297 |
| 5,167,403 | 12/1992 | Muramatsu et al. . | |
| 5,180,148 | 1/1993 | Muramatsu . | |
| 5,184,803 | 2/1993 | Tanabe et al. | 267/140.12 |
| 5,190,269 | 3/1993 | Ikeda et al. | 267/140.12 |
| 5,205,545 | 4/1993 | Quast . | |
| 5,205,546 | 4/1993 | Schisler et al. . | |
| 5,217,211 | 6/1993 | Ide et al. . | |
| 5,246,213 | 9/1993 | Zup et al. . | |
| 5,316,275 | 5/1994 | Maeno | 267/140.13 |
| 5,356,121 | 10/1994 | Ikeda | 267/140.12 |
| 5,388,812 | 2/1995 | Kojima et al. | 267/140.13 |
| 5,433,421 | 7/1995 | Ishiyama | 267/140.13 |
| 5,501,433 | 3/1996 | Satori | 267/140.13 |
| 5,571,264 | 11/1996 | Maruyama et al. | 267/140.13 |

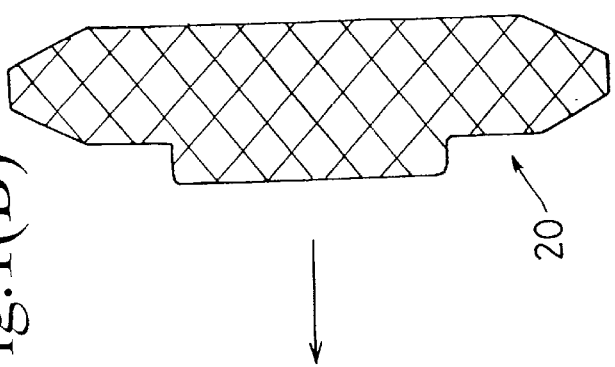
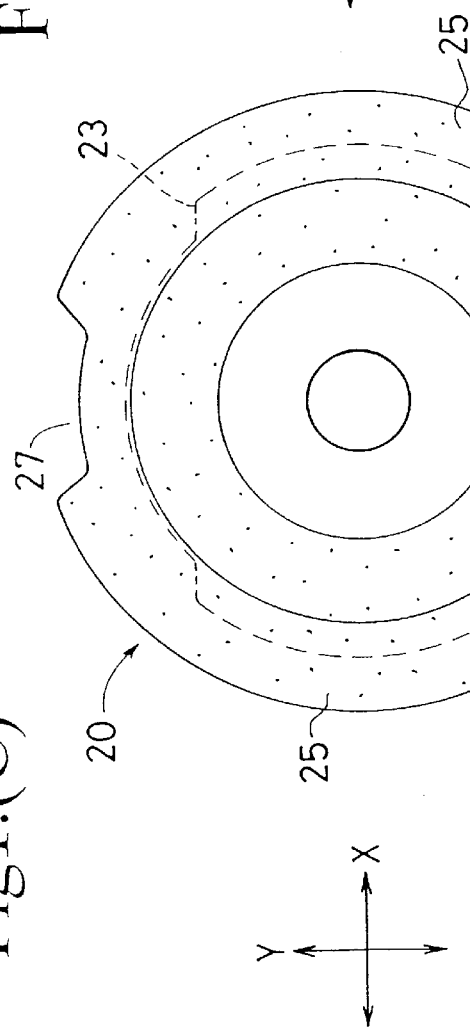
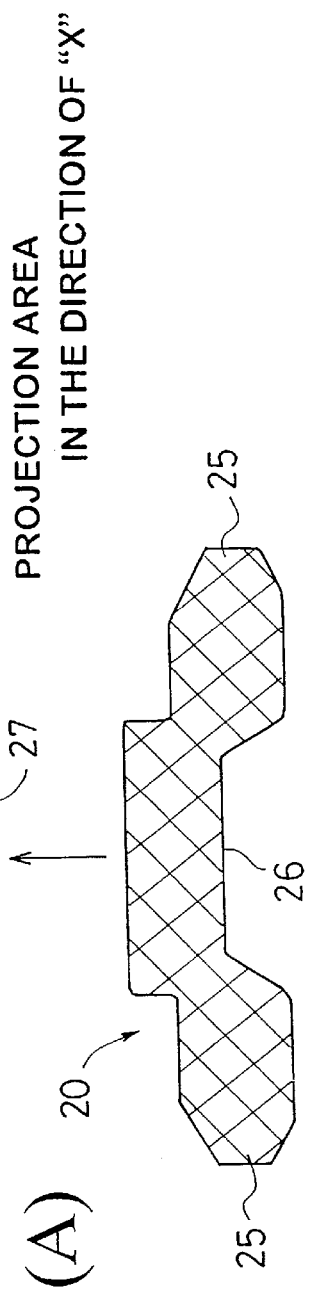
Fig.1(B)
Fig.1(C)
Fig.1(A)
PROJECTION AREA IN THE DIRECTION OF "X"
PROJECTION AREA IN THE DIRECTION OF "Y"

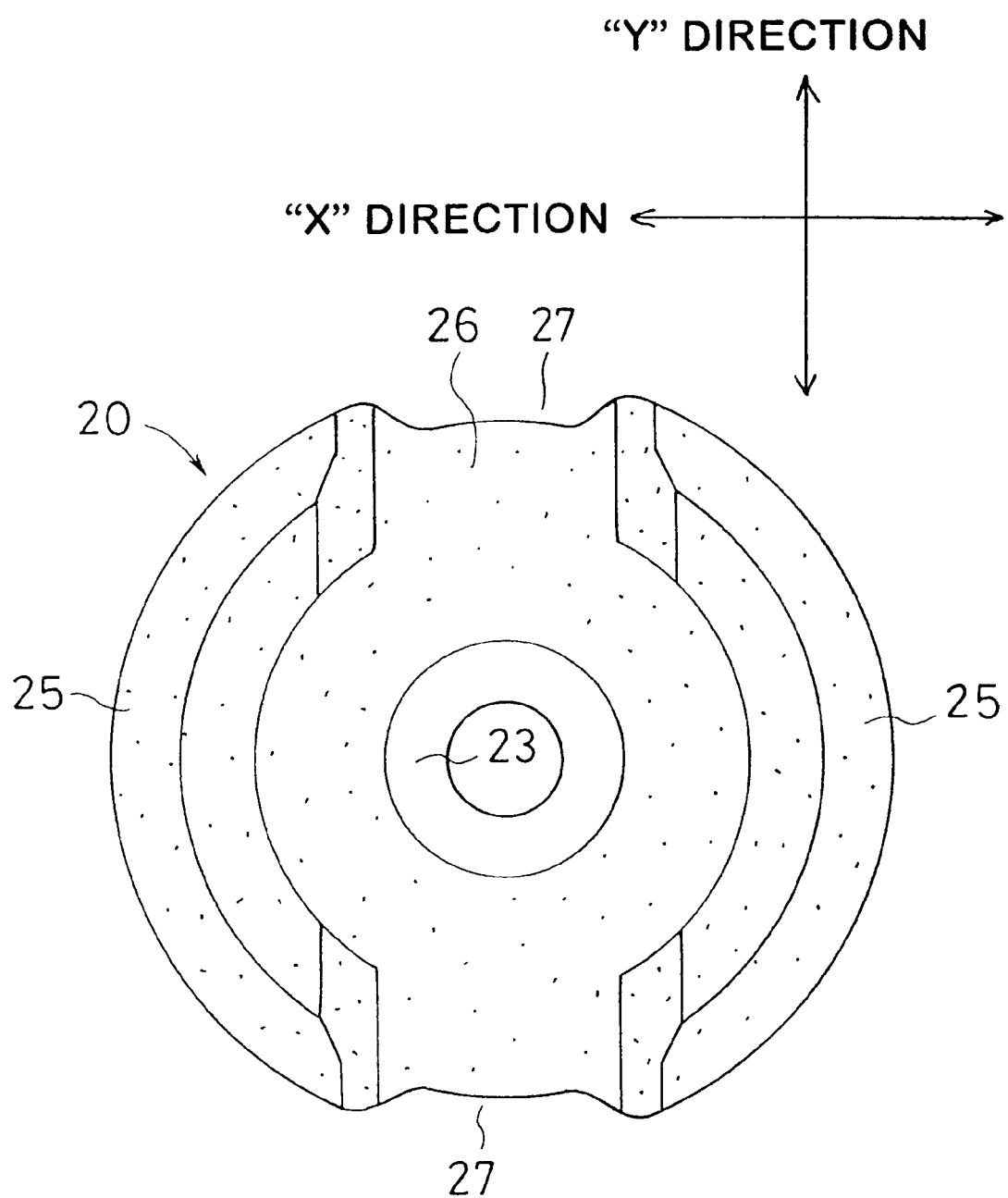

POINT LINE IN THE DIRECTION OF "Y"

POINT LINE IN THE DIRECTION OF "X"

<CONVENTIONAL DEVICE>

<PRESENT INVENTION>

ANTIVIBRATION RUBBER DEVICE

This application is a continuation of Application Ser. No. 08/905,335, filed on Aug. 4, 1997, now U.S. Pat. No. 5,772,189, which was a Rule 62. Continuation of Application Ser. No. 08/490,743, filed Jun. 15, 1995 (now abandoned) the entire contents of which are hereby incorporated by reference.

BACKGROUND OF THE INVENTION

1. Field of the Invention

This invention relates to an antivibration rubber device such as a suspension mount rubber and an engine mount rubber of an automobile vehicle, and more particularly to an advantageous mechanism of an orifice plate and an elastic block provided within a fluid chamber to mainly isolate medium to high frequency vibrations.

2. Description of the Prior Art

One example of such an antivibration rubber device is disclosed in Japanese Laid-Open Patent Publication (Kokai) No. Sho 64-1566 comprising a first bracket secured to an automobile vehicle body, a second bracket secured to a vibrating member, a rubber portion disposed between the first and second brackets, a fluid chamber provided within the rubber portion, and an elastic partition wall dividing the fluid chamber into two chambers. The partition wall is provided with an orifice passage adapted to communicate with the two fluid chambers and an orifice plate provided within at least one of the divided fluid chambers to perform a relative movement integrally with a connecting member, thereby mainly isolating the medium to high frequency vibrations.

Since this orifice plate is formed to have a generally circular shape in the principal input direction Z of the vibrations to be isolated, in each vibration direction of the two directions X and Y which are perpendicular to the principal vibration input direction Z and intersect at right angles to each other, the projection surface shape and the projection area are almost equal. Therefore the minimum value of the dynamic spring constant in each vibration direction of X and Y is also almost the same level and the resonance frequencies a and b in each vibration direction of X and Y are also substantially equal as shown in FIG. 10(A).

In the figure, a horizontal axis shows the frequency of the input vibration and a vertical axis shows the dynamic spring constant, in which the letter c shows the resonance frequency in the direction Z. In the following description, the direction represented by X, Y, and Z means the direction of vibrations input along any of the axes in the three directions X, Y, and Z which intersect at right angles to each other.

However, in a certain specification, the resonance frequency in each vibration direction of X and Y is not made equal. For example, the resonance frequency in the direction X is the same as before, but it may be required to be capable of performing the displacement control, while in the direction Y, it may be required to move the resonance frequency to a higher frequency side. However, in the prior art, it has not been possible to change a characteristic every different vibration direction such as the directions X and Y.

On the other hand, as one example of an elastic block, there has been proposed an engine mount in which an upper bracket on the side of an engine and a lower bracket on the side of a vehicle body are connected by the elastic block made of rubber which is formed as a cylindrical member of a generally truncated cone shape when viewed from a side.

There is also a specification in which a spring constant in the principal input direction Z of the vibrations to be isolat and, the ratio of the spring constant of each of the two directions X and Y which are perpendicular to the input direction Z (and also intersect at right angles to each other) is required to be more than 1. In this case, the elastic block is formed as a cylindrical member of a generally truncated cone shape when viewed from a side, and the open end on the side of a smaller diameter which is the upper portion of the elastic block is formed with a taper surface slanting inward, wherein the upper bracket formed with the corresponding taper surface is arranged to contact the taper surface of the elastic block.

With such a construction, it is possible to realize the ratio described above, but since the elastic block is principally loaded with load in the shearing direction, the creep amount due to the engine heat increases and it has the drawback that the elastic block can not be used when the allotted load is over 100 Kilograms (kgs). In this case, it has been proposed to use a stiffening ring at the middle portion of the elastic block, but it has the drawback of making the products large-sized.

It is therefore an object of the present invention to provide an improved antivibration rubber device which can overcome all of such drawbacks as found in the prior art.

SUMMARY OF THE INVENTION

In order to solve the problems described above, according to the present invention, there is provided an antivibration rubber device having an orifice plate in which the orifice plate has a different projection area in each of three input directions of a principal input direction Z and two other directions X and Y (are perpendicular to the direction Z and also intersect at right angles to each other,) of vibrations to be isolated. The antivibration rubber device has a generally disc shape when taken in the direction of an axis of a connecting shaft provided parallel to the axis Z. It has a predetermined thickness and is provided with a transverse recess parallel to one of either the direction X or Y.

In this case, the projection area of the orifice plate is adapted to vary, whether large or small, with the change of a projection surface shape and it is preferable to provide stoppers at the edge portions of both ends in the projection surface of at least one of either the direction X or Y, of the circumference of the orifice plate, for displacement control.

Moreover, at least one of either the cross-section of the orifice plate in the direction X or the cross-section in the direction Y may be made asymmetric. In the circumference of the orifice plate, the distance between the orifice plate and a circumferential inner wall portion surrounding the orifice plate may be made unequal. Also, the stoppers may be made asymmetric.

Thus, each projection area of the orifice plate in the three directions X, Y, and Z is different and as shown in FIG. 10(B), corresponding to each projection area, resonance frequencies a, b, and c in the three directions are different from each other to have the relation: a<b<o which are clearly separate from each other.

The difference of the projection area in the directions X and Y is produced by the transverse recess formed along one of the directions X and Y. Further, the projection area may also be changed by changing the projection surface shape.

For example, when the area projected in the direction Y (hereinafter referred to as "Y direction projection area") is made smaller than that projected in the direction X (hereinafter referred to as "X direction projection area"), as the resonance frequency with a smaller projection area is apt to move to the higher frequency side, as shown in FIG. 10(B), there is a large difference in the resonance frequency between them and it is easy to make the resonance frequency higher than that in the direction X.

Furthermore, when the stoppers are provided, for example, at the portions in the direction X, of the circumference of the orifice plate, it is possible to further change the resonance frequency in the direction the Y much more than resonance frequency in the direction X. At the same time, it is possible to perform the displacement control in the direction X.

Furthermore, when at least one of either the cross-section in the direction X or the cross-section in the direction Y, of the orifice plate is made asymmetric, and in the circumference of the orifice plate, the distance between the orifice plate and the inner wall portion of the circumference surrounding the orifice plate is made unequal, it is possible to optionally set the displacement control corresponding to the vibration direction. In this case, when the stoppers are made asymmetric, it is possible to optionally set the displacement control relative to the vibration in a more specific direction of the direction Y or X. It is also possible to form a sufficient pressure receiving surface.

According to the present invention, there is provided an antivibration rubber device comprising a first connecting member secured to one side of either an automobile vehicle body or a vibrating member, a second connecting member secured to the other side of the vehicle body or the vibrating member, an elastic block disposed between the first and second connecting members. A spring constant in the principal input direction Z of vibrations to be isolated and, the ratio of the spring constant in each of the two directions X and Y (which are perpendicular to the direction Z and also intersect at right angles to each other) are greater than 1. In a load condition of a predetermined static load, a relative position of each load receiving surface of the first connecting member and the second connecting member in the principal input direction Z is arranged to correspond or overlap when viewed from a side.

The elastic block may be made cylindrical to have a generally truncated cone shape when viewed from a side and each point line which is an upper and lower inflection point on the outer surface may be formed to have a generally round shape. It is preferable that each point line is concentrically arranged when viewed from a top and the height of each point line is changed in the circumferential direction.

There is further provided on one side of either the first or second connecting member a flange which projects in the direction perpendicular to the direction Z and the elastic block is integrally provided with a projecting portion to overlap the flange, wherein the projecting portion is made thick and its thickness can also be changed.

In the above mechanism, a fluid chamber may be provided between the first and second connecting members and the elastic block. The elastic block is divided by a partition wall into a plurality of chambers and these chambers are filled with a fluid and adapted to communicate through an orifice passage.

With such a construction, in a load condition of a predetermined static load, a relative position of each load receiving surface of the first and second connecting members in the principal input direction Z is arranged to correspond or overlap when viewed from a side. Accordingly, even if the ratio of the spring constant of the elastic block in the direction X or Y to the direction Z is set to be more than 1,
it is not necessary to provide a ring at the middle of the elastic block and therefore the overall size is made compact.

When the point line on the side of the first connecting member and the point line on the side of the vehicle body are formed to be round and are concentrically arranged when viewed from a top, and the height is changed in the circumferential direction, it is possible to change the spring ratio of the directions X and Y to the direction Z to ease the stress of the elastic block, thereby improving the durability.

Furthermore, as the thick projecting portion is provided on one side of either the first or second connecting member to project in the direction perpendicular to the direction Z and as it is formed with a thickened portion which is adapted to be changed along the circumference, it is possible to change the spring ratio of the directions X and Y to the direction Z to ease the stress of the cylindrical portion, thereby improving the durability.

The above and other objects, features, and advantages of the invention will become more apparent from the following description of the preferred embodiments when taken in conjunction with the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a view showing an orifice plate of a first embodiment and each projection area in the directions X and Y together;

FIG. 6 is a bottom plan view of the orifice plate according to the first embodiment;

DETAILED DESCRIPTION OF THE PREFERRED EMBODIMENT

Figure 2:
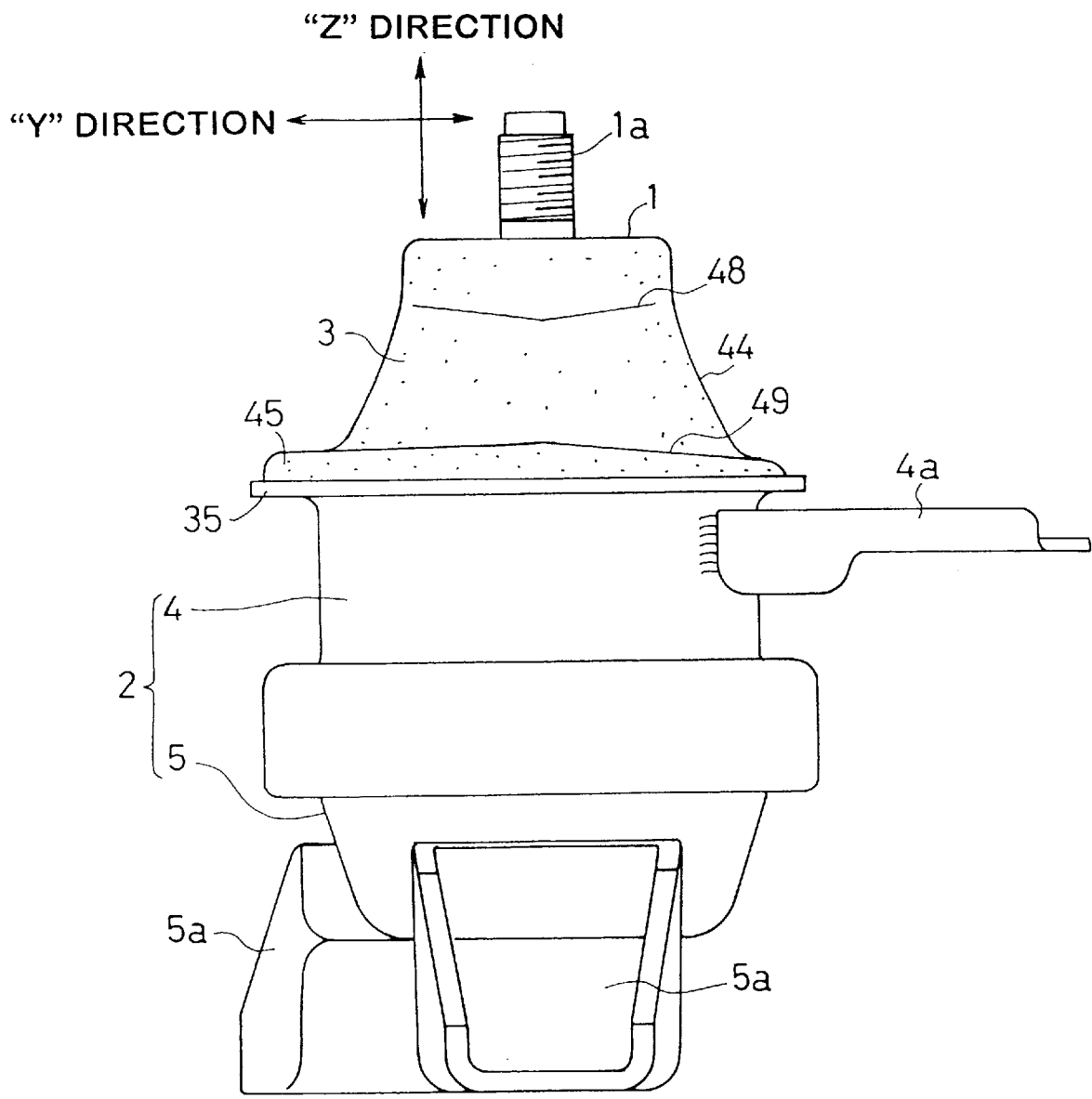
FIG. 2 is a side view of an engine mount according to the first embodiment.
Figure 3:
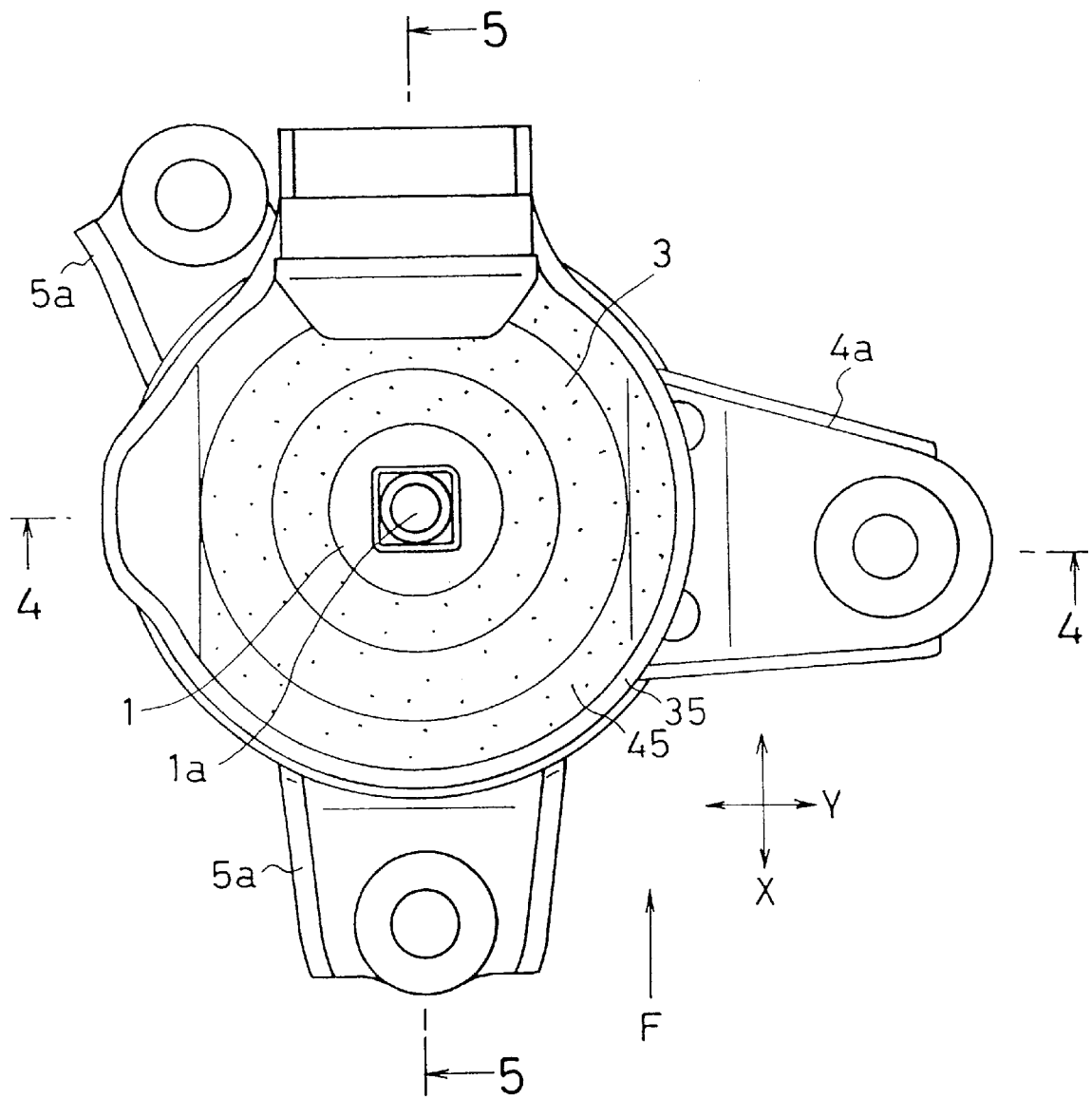
FIG. 3 is a plan view of the engine mount according to the first embodiment.
Figure 4:
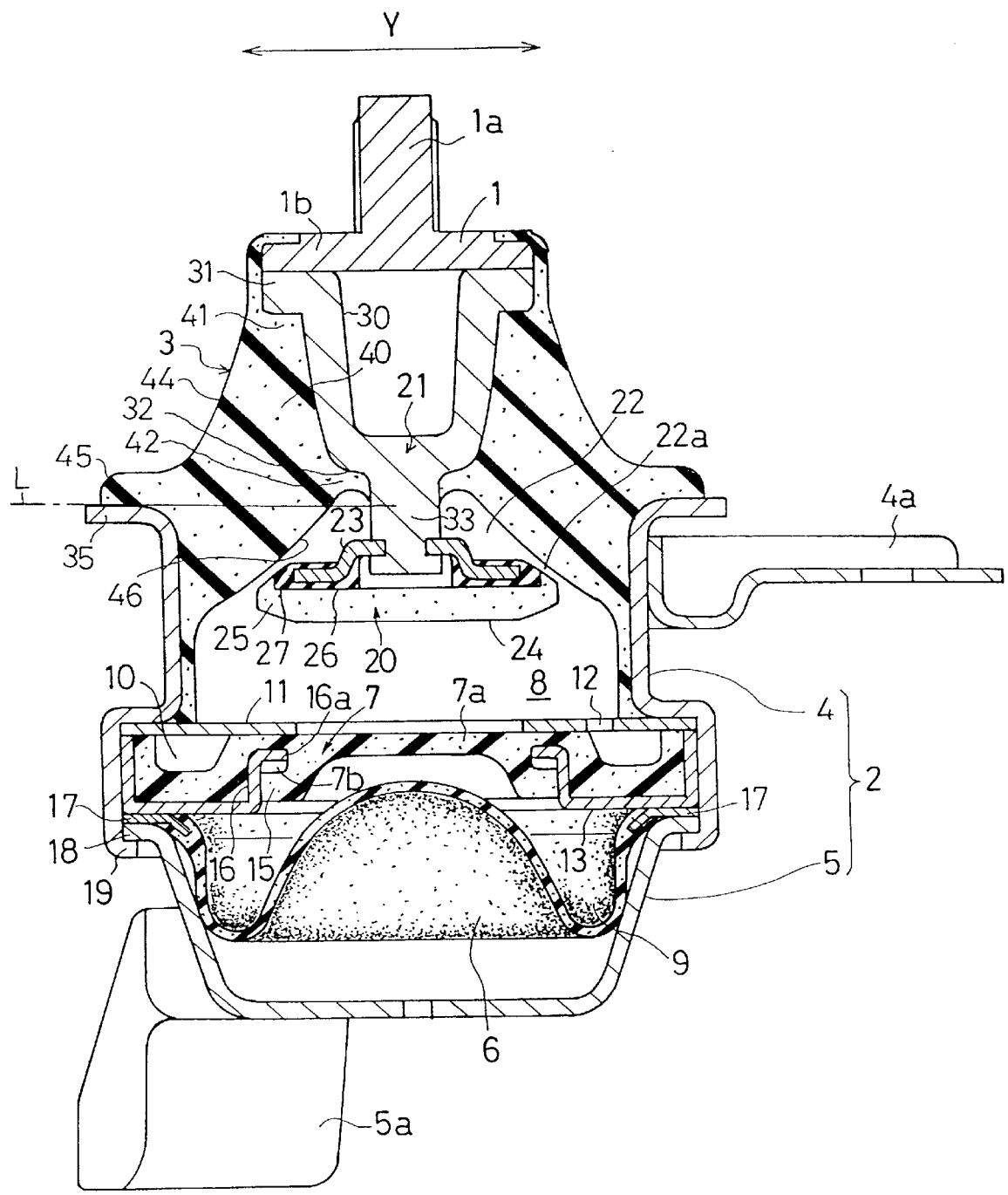
FIG. 4 is a cross-sectional view taken in line 4—4 of FIG. 3.
Figure 5:
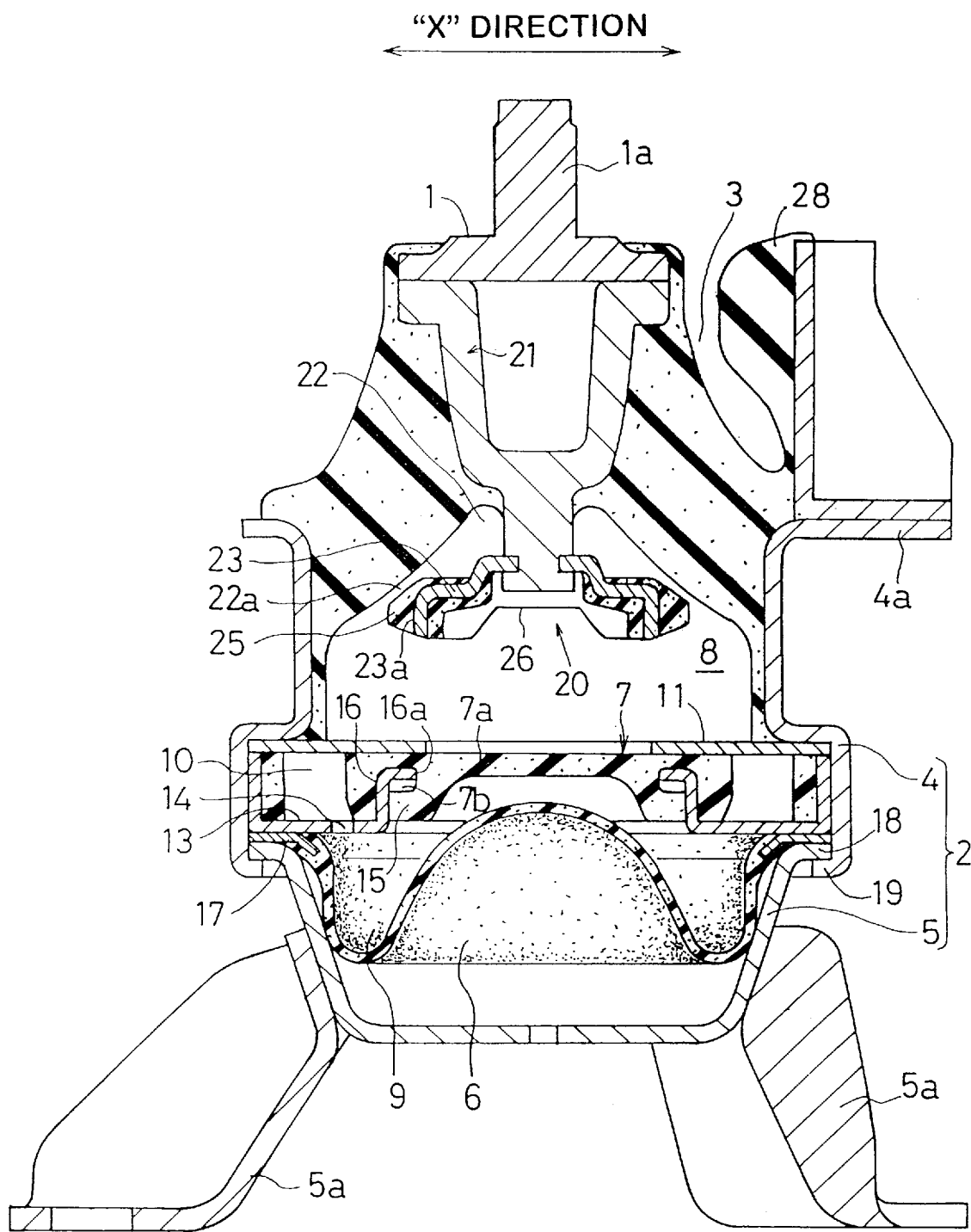
FIG. 5 is a cross-sectional view taken in line 5—5 of FIG. 3.

Referring first to FIGS. 1 through 10, a first embodiment constructed as an engine mount will be described below. FIG. 2 is an entire side view of the engine mount (the view taken in the direction of the arrow F of FIG. 3) and FIG. 3 is a plan view. FIG. 4 is a cross-sectional view taken along line 4—4 of FIG. 3 and shows a cross-section taken along the direction Y (hereinafter referred to as Y direction cross-section) of the two directions X and Y which are perpendicular to the principal vibration input direction Z (see FIG. 2) of vibrations to be isolated and also intersect at right angles to each other and FIG. 5 is a view showing a cross-section taken along the direction X (Hereinafter referred to as X direction cross-section).

In these figures, there is provided the engine mount in which a first connecting member 1 secured to the engine as a bolt 1a and which is a vibrating side and a second connecting member 2 secured to an automobile vehicle body are connected to both end portions of a hollow elastic block 3 made of rubber which is formed to have a generally truncated cone shape. However, the connecting relation between the engine side and the vehicle body side may be reversed.

The second connecting member 2 is provided with a generally cylindrical body portion 4 and a housing 5 secured to one end of the body portion. A diaphragm 6 is provided inside the housing 5. The diaphragm 6, the second connecting member 2 and the elastic block 3 forms a fluid chamber which is filled with an incompressible fluid. Reference numerals 4a and 5a are securing brackets secured to the body portion 4 and the housing 5, respectively.

The fluid chamber is divided by an elastic partition wall 7 into a first chamber 8 on the side of the elastic block 3 and a second chamber 9 below the elastic partition wall 7 and both chambers are adapted to communicate with each other through an orifice passage 10. The orifice passage 10 is formed between an upward opening ring groove formed in the circumferential portion of the elastic partition wall 7 and a ring plate 11 mounted on the elastic partition wall 7 to cover the opening portion and is adapted to communicate with the first chamber 8 through a communication bore 12 formed in a part of the ring plate 11 and with the second chamber 9 through a hole 14 (see FIG. 5) formed in a partition wall supporting member 13.

The elastic partition wall 7 is provided with an outer circumferential portion on which the ring plate 11 is mounted, a thin membrane portion 7a integrally formed on the central side and a stopper portion 15 formed under the membrane portion 7a at the boundary portion with the outer circumferential portion. The stopper portion 15 is a lip-like portion separated from the elastic partition wall 7 through a separation groove 7b and its top end is arranged to strike an inner wall 16 of the partition wall supporting member 13.

The stopper portion 15 is arranged such that its end is in a contact condition with the inner wall 16 of the partition wall supporting member 13 in advance or begins to contact with or strike the inner wall 16 when the membrane portion performs a predetermined elastic deformation, thereby imparting a nonlinearity on the spring characteristics of the membrane portion.

The partition wall supporting member 13 is a ring-shaped member having a generally U-shaped cross-section and arranged along the opposite surface (the reverse side) of the elastic partition wall 7 parallel to the ring plate 11. The outer circumferential portion of the elastic partition wall 7 engages with the generally U-shaped portion. The top end 16a of the inner wall 16 on the inner circumferential side enters the separation groove 7b to be bent inward toward the center side parallel to the ring plate 11.

The partition wall supporting member 13 engages the outer circumferential portion of the elastic partition wall 7 and in such a condition, the ring plate 11 mounts on the partition wall supporting member 13. A ring 17 is secured around the diaphragm 6 and put under the bottom of the partition wall supporting member 13 to be mounted on a flange 18 of the housing 5. Then, they are firmly secured to the second connecting member 2 together by caulking (or clamping) the open end portion 19 of the body portion 4.

Within the first chamber 8, the orifice plate 20, which is intended to primarily damp the vibrations of the high frequency range, is secured to the end of a supporting member 21 which is integrally formed with the first connecting member 1 projecting inside the first chamber 8 through the axis portion of the elastic block 3. A small fluid chamber 22 is formed between the circumference of the orifice plate 20 and the elastic block 3 and adapted to communicate with the fluid chamber 8 through a narrow communication passage 22a around the orifice plate 20.

FIG. 1(C) is a plan view of the orifice plate 20 in the direction Z and FIG. 6 is a bottom plan view thereof. FIG. 1(A) shows a projection area in the direction Y and FIG. 1(B) shows a projection area in the direction X which is perpendicular to the direction Y.

As apparent from FIGS. 1 and 4, the orifice plate 20 has a generally circular shape when viewed from a top and is composed of a metallic plate 23 secured to the supporting member 21 and an elastic portion 24 adapted to cover the circumference of the metallic plate 23. The elastic portion 24 is selectively made by rubber and other elastic synthetic resins.

The plate 23 is formed to have a generally cup-shaped cross-section and in its circumference, the end is bent downward in the direction Y to form a vertical flange 23a (see FIG. 5) entering inside the stoppers 25, while in the direction X, such a vertical flange 23a is not formed and arranged to face a substantially horizontal direction (see FIG. 4).

The stoppers 25 are the integral part of the elastic portion 24 and are formed, at the peripheral edge portion of the orifice plate 20, by thickening a part of the elastic portion 24. The stoppers are not formed near the central line in the direction Y of the circumference of the orifice plate 20. A cutout portion 27 is formed at this portion.

As apparent from FIG. 6, the orifice plate 20 is provided at the bottom portion thereof with a recess 26 traversing in the direction Y which corresponds to the transverse recess of the present invention. Each projection area of the orifice plate 20 in the directions X and Y varies with the recess 26.

However, the projection area in the direction Z is almost the same as that in the portion of the plan view of FIG. 1 (C) and clearly different from the projection area in the directions X and Y and when each projection area is shown by X, Y, and Z, the relation is Y<X<Z.

As best shown in FIG. 5, there is provided on the securing bracket 4a a stopper projection 28 which is capable of contacting the outer surface of the elastic block 3 in the direction X, thereby controlling the excessive deformation of the elastic block 3 in the direction X.

Next, referring to FIG. 4 and FIFS. 7 through 9, the elastic block 3 will be described. As shown in FIG. 4, the first connecting member 1 comprises a plate 1b integrally formed with a bolt 1a and a supporting member 21 welded thereto. The supporting member 21 is formed to have a generally wine glass shape and provided with a hollow taper portion 30 of a downwardly narrowing shape and a neck portion 33. The taper portion 30 is an upwardly opened member and an outer flange 31 provided on the open end overlaps the plate 1b for unification. The taper portion 30 continues at the bottom portion 32 to the neck portion 33 which projects inside the fluid chamber 8.

The bottom portion 32 serves as a load receiving portion on the lower end side of the supporting member 21 which is a metal fitting on the vibration side. In a load condition of a predetermined static load where an allotted load of heavier than 100 kgs is loaded, the bottom portion 32 is in a matching position to overlap a standard line L which shows a load receiving surface of the outer flange 35 corresponding to the upper surface of the vibration receiving side metal fitting (see FIG. 9).

The standard line L shows the upper surface of the outer flange 35 serving as the load receiving surface in the second connecting member 2 which is a vibration receiving side metal fitting, and along this standard line L, the outer flange 35 is formed to project continuously from the upper end portion of the body portion 4 toward the standard line L.

The elastic block 3 is a hollow member of a generally truncated cone shape having a smaller diameter upwardly and at the bottom portion, a generally circular cone shaped space is formed. At the axis portion of the elastic block 3 located at the upper part of the space, the supporting member 21 is vertically and longitudinally incorporated.

The central portion 40 of the elastic block 3, which surrounds the circumference of the taper portion 30 of the supporting member 21, has a downwardly narrowing slant at its inner circumference to correspond to the outer circumference of the taper portion 30 of the supporting member 21. Near the opening edge portion of the upper end, there is formed an upper step portion 41 for engaging the outer flange 31 and a lower step portion 42 on which the bottom portion 32 is mounted. The bottom portion 32 is a portion which connects the taper portion 30 of the supporting member 21 to the upper end portion of the neck portion 33.

The outer surface 44 of the elastic block 3 is formed to have a downwardly widening slope. At a middle portion thereof, there is integrally formed a flange-shaped thick projecting portion 45 which projects parallel to the outer flange 35 in the direction perpendicular to the axis, i.e. in the displacement directions X and Y. This thick projecting portion 45 is formed to be thick and is mounted on the outer flange 35. The thickness is designed to be gradually thicker from the peripheral portion toward the shaft center.

The inner surface 46 surrounding the space of the generally circular cone shape of the elastic block 3 is formed to have a curved surface of a gentler slope than that of the outer surface 44, wherein the portion held between the outer surface 44 and the inner surface 46 connects the first connecting member 1 and the body portion 4 in a slightly oblique direction and it is formed to be slightly thinner on the side of the body portion 4. The lower part of the elastic block 3 is designed to have a thin cylindrical portion along the inner surface of the body portion 4. The spring constant of the elastic block 3 is also set such that the ratio of the direction X or Y relative to the direction Z is more than 1, respectively.

Figure 7A:
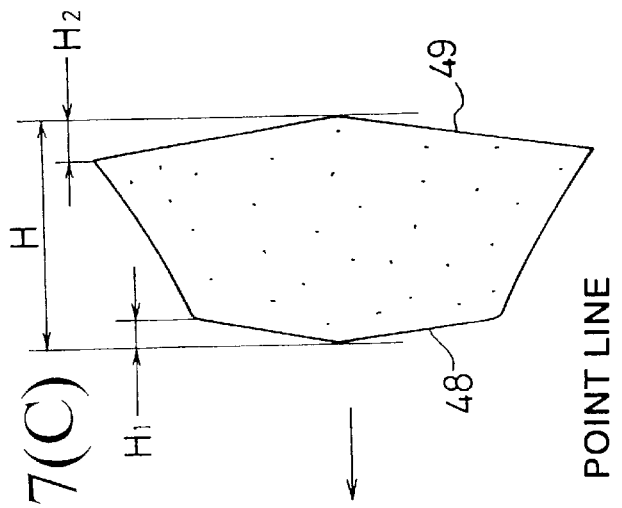
FIG. 7(A)–(C) are views showing a plane of an elastic block and each side surface there of in the directions X and Y.

FIG. 7(A) is a view showing the relation between a point line 48 on the side of the first connecting member 1 of the elastic block 3 and a point line 49 on the side of the body portion 4 from the direction Z, wherein both point lines are arranged on the concentric circles to have a general roundness. In this case, the point line 48 on the side of the first connecting member 1 has a smaller diameter than that of the point line 49 on the side of the body portion 4.

Figure 9:
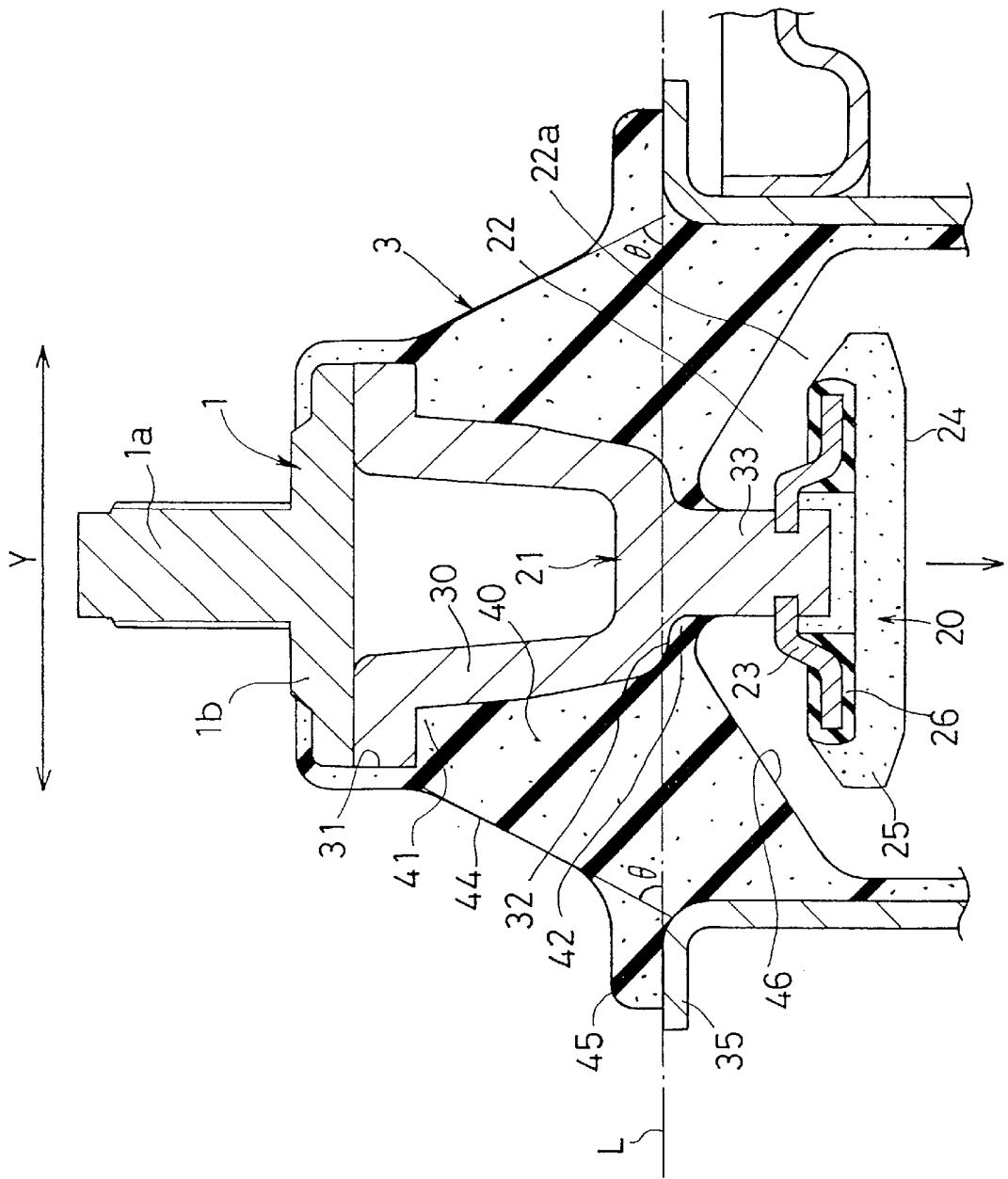
FIG. 9 is an enlarged cross-sectional view of the essential parts in a static load condition.

These point lines 48 and 49 are the lines connecting inflection points formed in the circumferential direction on the upper and lower portions of the outer surface 44. As shown in FIG. 9, the outer surface 44 has a slope in which the middle portion thereof in the upper and lower directions intersects at an angle of θ to the standard line L and it is formed along portions which are inflected very much on the upper and lower sides of the standard line L.

Figure 7C:
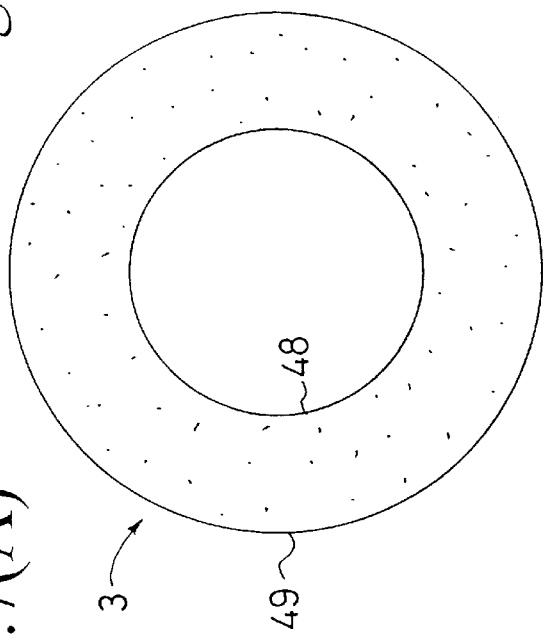
Figure 7B:
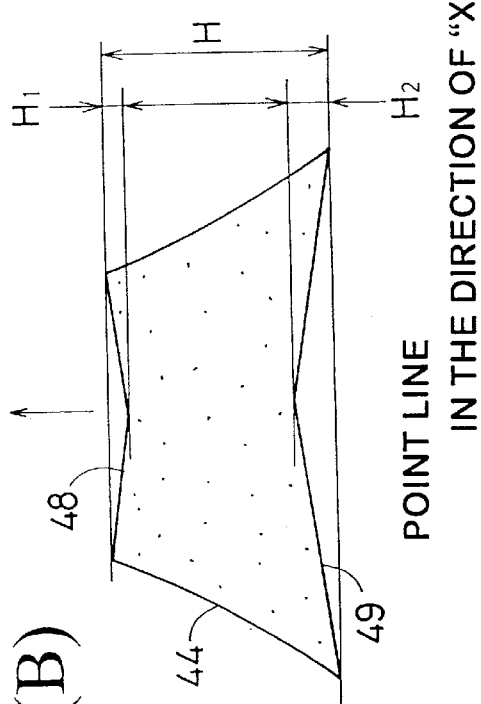
Figure 8:
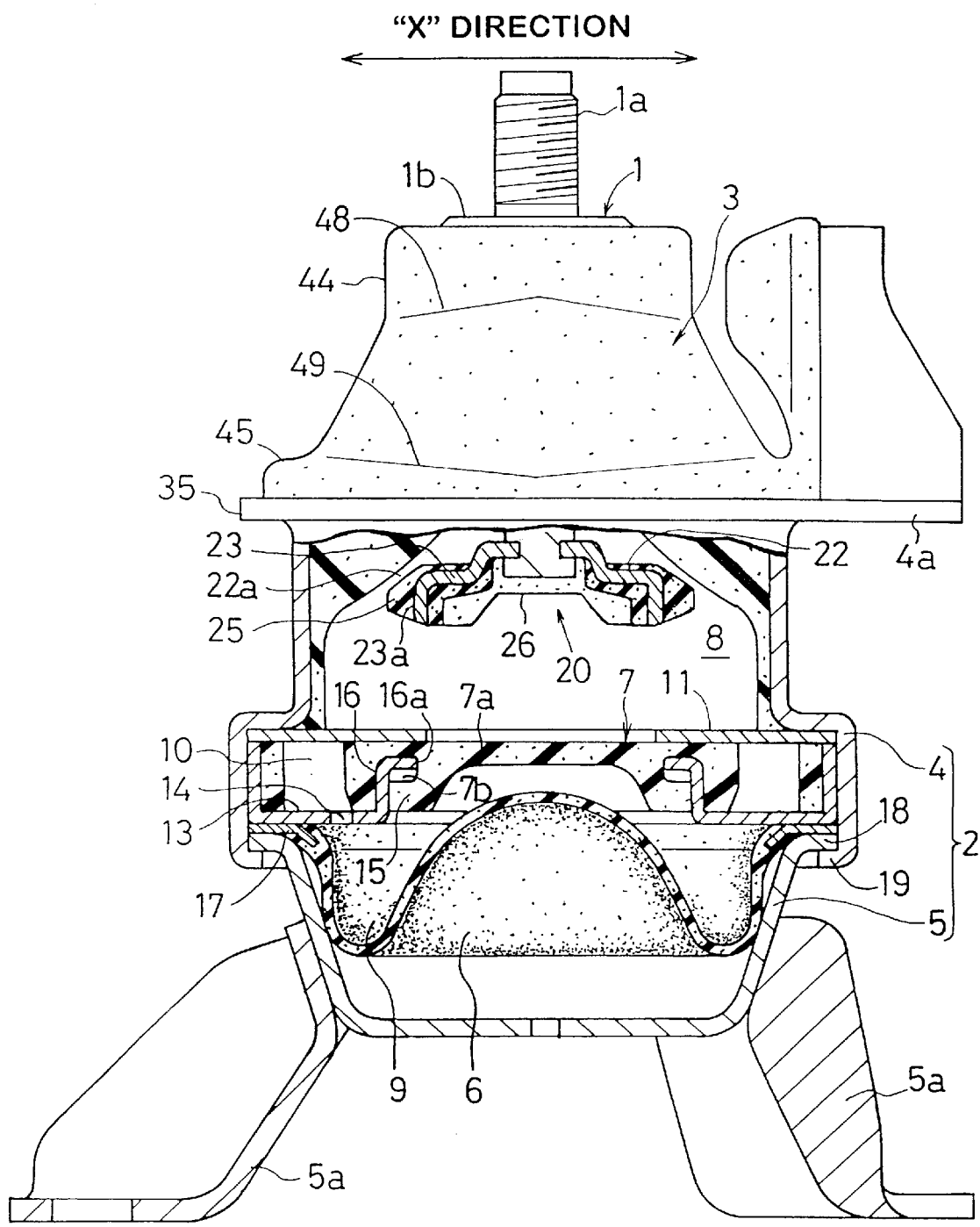
FIG. 8 is a semi cross-sectional view of the engine mount taken in the direction of the arrow X of FIG. 3 according to the first embodiment.

FIG. 7(B) and FIG. 7(C) are views showing these point lines from the directions X and Y, respectively. The point line 48 on the side of the-first connecting member 1 and the point line 49 on the side of the body portion 4 vary such that they have the height differences of H1 and H2, respectively, as illustrated in FIGS. 7(B) and 7(C) point line 48 on the side of the first connecting member 1 has the lowest point when viewed in the direction X, while it has the highest point when viewed in the direction Y. On the contrary, the point line 49 on the side of the body portion 4 has the highest point, when viewed in the direction X, while it has the lowest point when viewed in the direction Y. Accordingly, the distance in the Z direction between the point lines 48 and 49 are at a minimum and maximum when viewed in the X and Y directions, respectively.

Figure 10A:
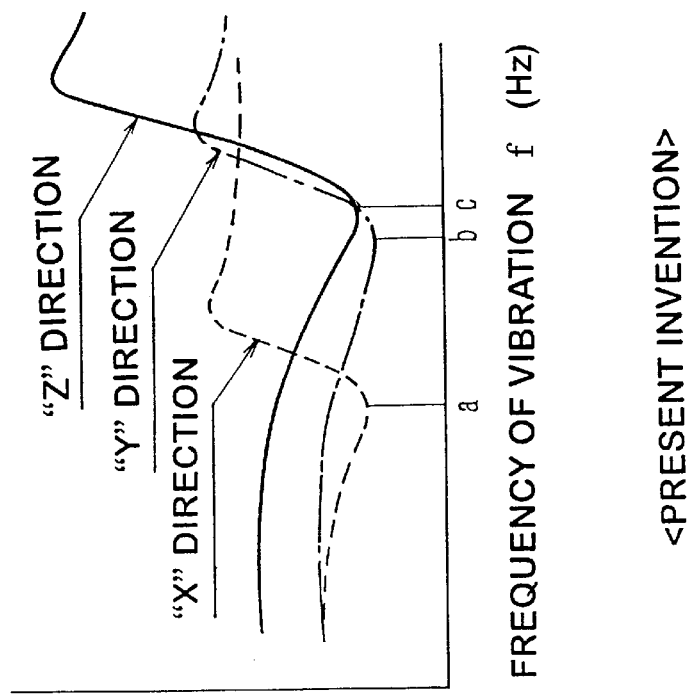
FIG. 10 (A)-(B) are graphs showing the resonance frequencies of the present invention and the prior art together.
Figure 10B:
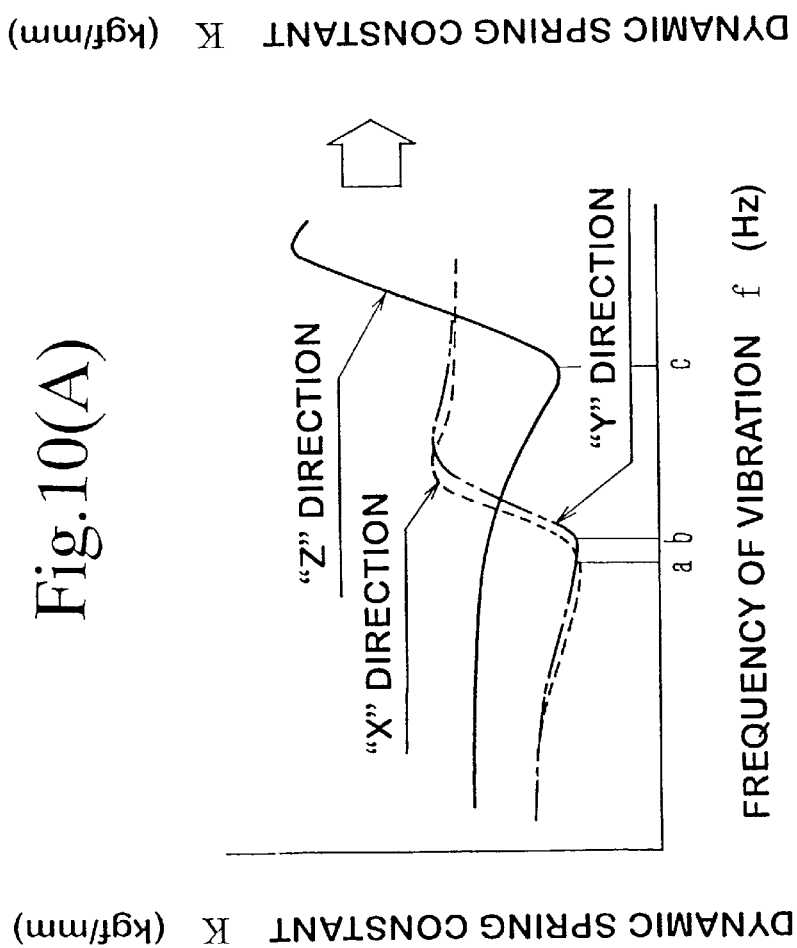

Next, the operation of the present embodiment will be described below. As described above, the projection areas of the orifice plate 20 in the three directions X, Y, and Z are different from each other and therefore, as shown in FIG. 10(B), the resonance frequencies of a, b and c are also different from each other in response to their projections to have the relation of a<b<c.

Thus, when the vibrations are input, the minimum value of the dynamic spring constant in the resonance frequency is generated by the orifice plate 20, but the magnitude of the minimum value of the dynamic spring constant varies with the projections area in each vibration direction. As shown in FIG. 10(B), the resonance frequencies in the three directions are clearly separated from each other.

Accordingly, it is easy to make the resonance frequency in the direction Y higher than that in the direction X and possible to effect the displacement control in the direction X by means of the stopper 25 which is the projection surface shape portion for enlarging the projection area in the direction X.

It will be understood that the present invention is not limited to the embodiments described above, but may be varied in many ways. For example, the projection surface shape in each direction may be optionally set according to the object and likewise, the relative magnitude of each resonance frequency A, B, or C may also be optionally set. The orifice plate 20 may be formed in one side of either the first chamber 8 or the second chamber 9, or it may be formed in both the chambers.

Referring to the elastic block 3, in FIG. 4, for example, the first connecting member 1 is secured to the engine and the bracket 4a of the second connecting member 2 is secured to the vehicle body, whereby the allotted load of higher than 100 kgs is loaded in a load condition of the static load. In this case, as apparent from FIG. 9, the bottom portion 32 which is the lower end portion of the first connecting member 1 is situated at the same position as the standard line L.

Accordingly, even if the spring constant of the elastic block 3 is set such that the ratio of the direction X or Y to the direction Z is more than 1, respectively, it is not necessary to provide the ring at the middle of the elastic block 3 and the device is made more compact without being over-sized.

In the present embodiment, the relative position between the bottom portion 32 and the outer flange 35 is arranged to correspond with each other when the lower end portion of the bottom portion 32 is on the standard line L and as shown in FIG. 9, when the standard line L passes through the central portion of the bottom portion 32 in a side view, the relative position is arranged to overlap each other. In the latter case, the bottom portion 32 may be lowered than the standard line L.

Furthermore, since the point line 48 on the side of the first connecting member 1 and the point line 49 on the side of the body portion 4 are arranged to have roundness in a plan view, it is possible to change the spring ratio of the directions X and Y to the direction Z to ease the stress of the elastic block 3, thereby improving the durability thereof. Since each point line is arranged on the concentric circle and its height is changed in the circumferential direction, it is possible to heighten further such an effect.

It is to be noted that the same effect as above can be obtained by only having each point line made rounded in a plan view, or by combining such round arrangement of each point line with their arrangement in the concentric circle, or with the change of their height in the circumferential direction.

The thick projecting portion 45 of the elastic block 3 which projects along the standard line L in the direction perpendicular to the direction Z is made thickened and the thickness is changed to be gradually larger toward the axis and as a result, it is possible to improve the durability of the elastic block 3.

Referring to FIGS. 11 through 15, a second embodiment of the invention will be described below. This embodiment differs from the preceding embodiment in that the orifice plate 20 has a different mechanism and therefore, the functional portions common to the previous embodiment are given the same reference numerals. For example, the elastic block of the previous embodiments is interchangeable with the second embodiment. In the second embodiment, orifice plate 120 is connected to extended connecting member 1.

Figure 11:
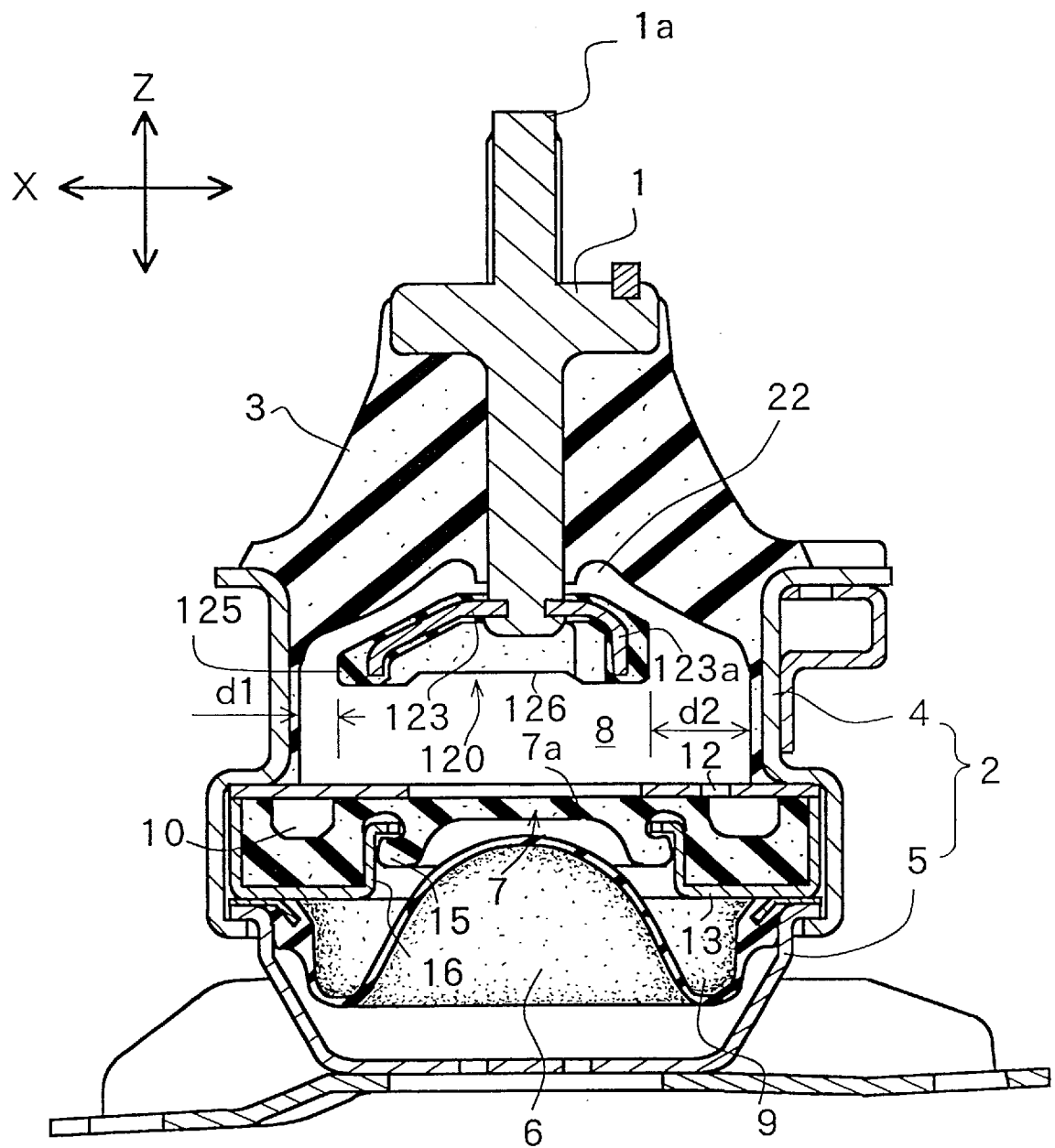
FIG. 11 is a cross-sectional view of the engine mount taken in the direction X according to a second embodiment.
Figure 12:
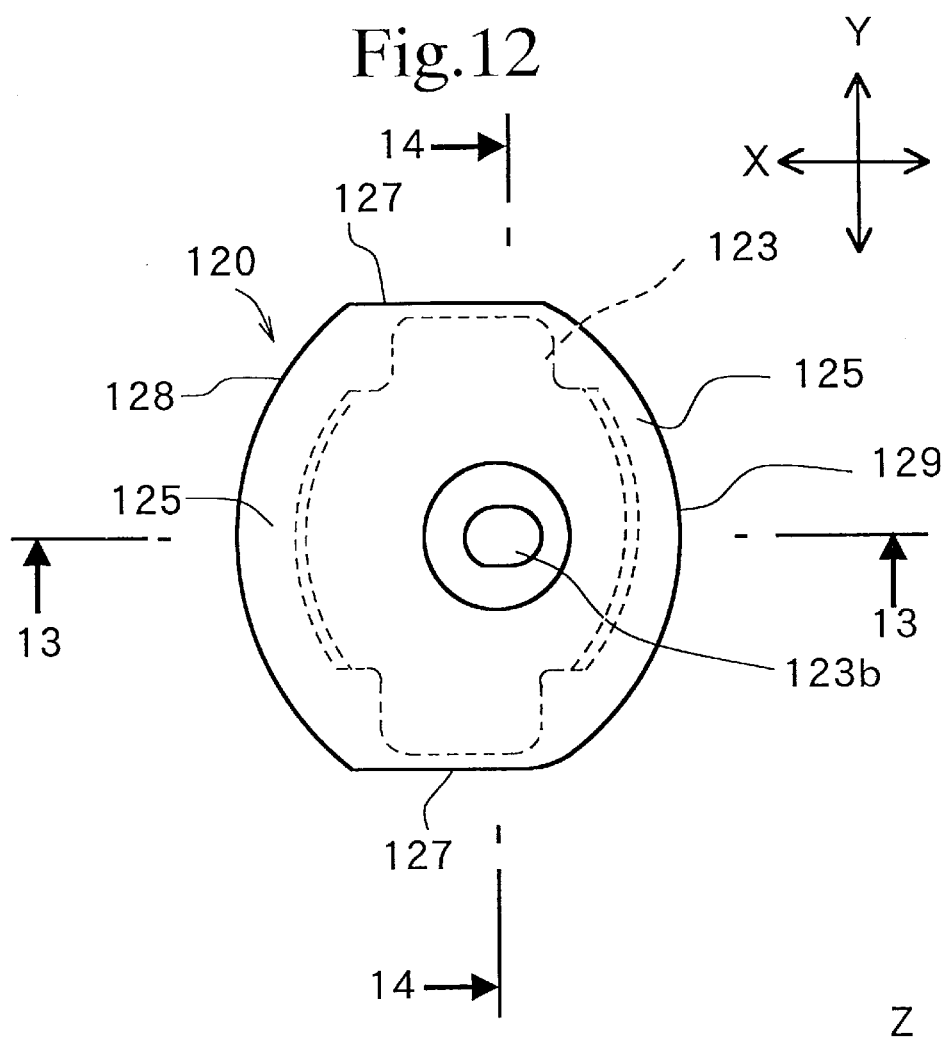
FIG. 12 is a plan view of the orifice plate according to the second embodiment.
Figure 13:
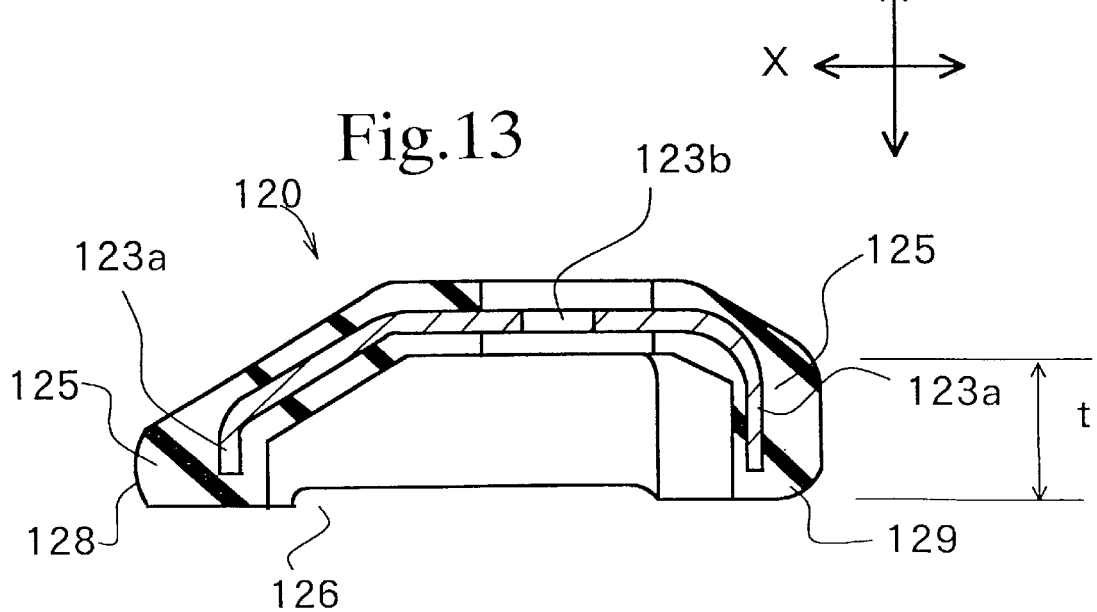
FIG. 13 is a cross-sectional view of the orifice plate taken in the direction X according to the second embodiment.
Figure 14:
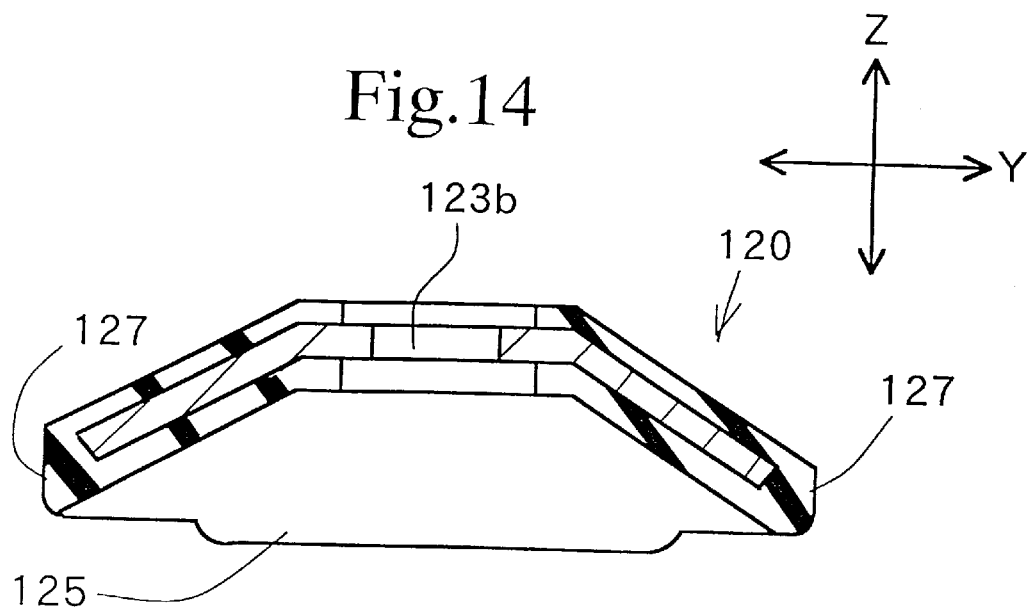
FIG. 14 is a cross-sectional view of the orifice plate taken in the direction Y according to the second embodiment.
Figure 15:
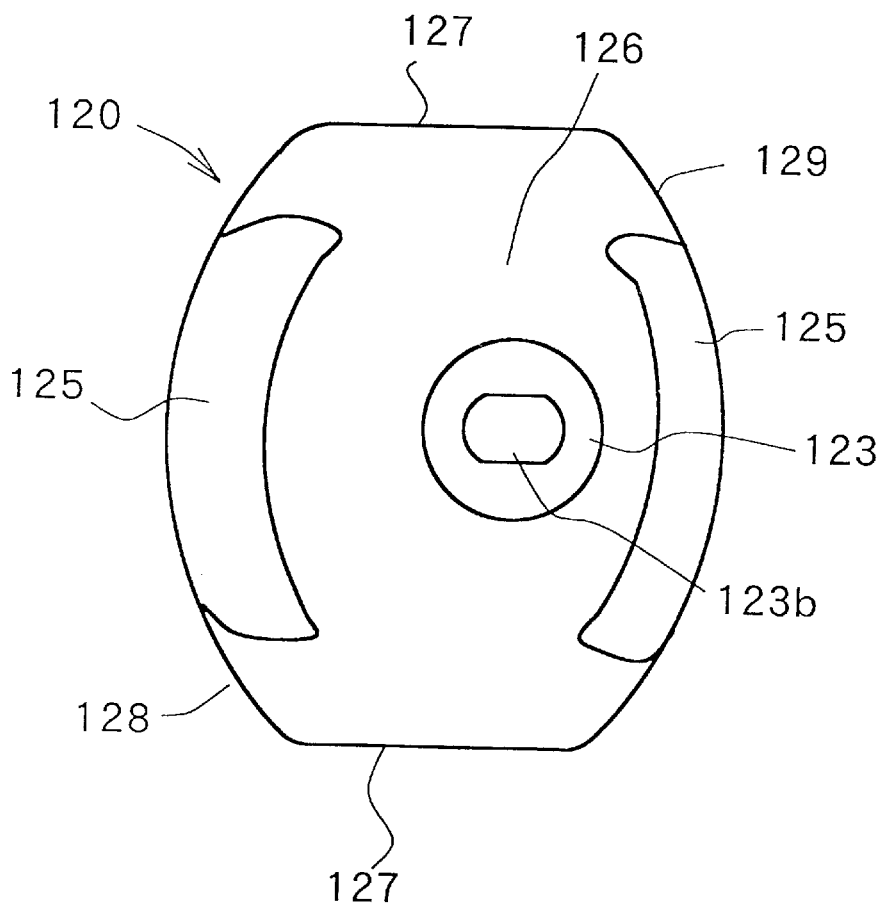
FIG. 15 is a bottom plan view of the orifice plate according to the second embodiment.

FIG. 11 is a vertical sectional view of an overall engine mount taken in the direction X. FIG. 12 is a plan view of only an orifice plate 120 taken in the direction Z and FIG. 13 is a cross-sectional view of the orifice plate 120 taken in line 13—13 of FIG. 12 in the direction X. FIG. 14 is a cross-sectional view of the orifice plate 120 taken in line 14—14 of FIG. 12 taken in the direction Y. FIG. 15 is a bottom plan view of the orifice plate 120.

As apparent from these figures, the orifice plate 120 is generally formed like an umbrella. Its opposite ends are formed as asymmetric round receiving surfaces 128 and 129 in the direction X, while in the direction Y, its opposite ends are formed with symmetric straight cutout portions 127.

Namely, as shown in the shape in the plan view of FIG. 12 and the cross-section taken in the direction X of FIG. 13, in the cross-section taken in the direction X, one receiving surface 128 is formed longer to project laterally than the other receiving surface 129 centering around a securing hole 123b for the supporting member 21 formed in the plate 123, while the other receiving surface 129 is formed to have a vertically larger width t than the receiving surface 128.

In the cross-section taken in the direction X, both ends of the plate 123 are formed to have flanges 123a, each end of which is made longer than the end of the cross-section taken in the direction Y, to project downwardly as shown in FIG. 11. A stopper portion 125 is formed around the end of the flange 123a and the outer surface of each stopper portion 125 is adapted to serve as the receiving surfaces 128 and 129.

With such an asymmetric cross-section taken in the direction X, as shown in FIG. 11, the distance d1 and d2 between both the ends and an inner wall of the engine mount surrounding the orifice plate 120 are not equal (d1<d2). In this case, the shape surrounded by the contour of the cross-section taken in the direction X is the projection surface shape in the direction Y, the area of which corresponds to the projection area taken in the direction Y.

On the other hand, as shown in FIG. 14, in the cross-section taken in the direction Y of FIG. 12, the cutout portions 127 of both the ends have about a half the length from the securing hole 123b to the receiving surfaces 128 and 129 and they project symmetrically. The shape surrounded by the contour of the cross-section taken in the direction Y is the projection surface shape taken in the direction X, the area of which corresponds to the projection area taken in the direction X.

Next, the operation of the second embodiment will be described. In the second embodiment as well, when the projection area in each direction X, Y, and Z is represented by the letters X, Y, and Z, the relation between them is Y<X<Z and the operational effect is the same as the preceding embodiment. However, in the present embodiment, the cross-section taken in the direction X is also made asymmetric and therefore, the control position to the vibrations in the direction X can be changed in the right and left directions of FIG. 11.

Accordingly, the displacement control of the orifice plate 120 by the stopper portion 125 in the direction X can be optionally set relative to the vibrations in the specific direction of the direction X. It is also easy to secure the pressure receiving surface to increase the displacement control effect.

According to the present embodiment, the vertical width "t" on the side of the receiving surface 129 is especially large. Therefore, in the vibrations in the direction X, it is possible to form sufficient pressure receiving surface relative to the vibrations in the direction in which the receiving surface 129 and the inner wall surface of the engine mount facing thereto come closer.

Moreover, according to the present embodiment, there is provided a recess 126 which is a transverse recess, between a pair of the stoppers 125. With a provision of this recess 126, a fluid resistance is lessened when the fluid flows in the direction Y and as a result, the projection area in the direction Y reduces apparently. Therefore, the recess has the effect of being capable of making the projection area in the direction Y smaller than the projection area in the direction X.

What is claimed is:

1. An antivibration rubber device comprising:
   a first connecting member having a first load receiving surface, said first connecting member being secured to one side of a vibrating member;

a second connecting member having a second load receiving surface which defines a planar region, said second connecting member being secured to another side of the vibrating member;

an elastic block disposed between the first and second connecting members; and a ratio of a spring constant of said elastic block in each of two directions X and Y of input directions which are substantially perpendicular to a principal input direction Z and intersect at substantially right angles to each other being arranged to be greater than 1 relative to a spring constant in said Z direction; wherein in a load condition of a predetermined static load, said first load receiving surface of the first connecting member substantially intersects said planar region defined by the second load receiving surface of said second connecting member in the principal input direction Z when viewed from a side.

2. The antivibration rubber device according to claim 1, wherein the elastic block is made to have a generally truncated cone shape when viewed from a side, an outer surface of the elastic block is formed to have a downwardly widening slope which has a changed inclination at inflection points formed in a circumferential direction, two point lines are formed by connecting the inflection points, said point lines are respectively formed continuously in a circumferential direction to have a generally round shape when viewed from a top of said elastic block and formed as a pair of lines at some distance on a position near to the first connecting member and on a position near to the second connecting member when viewed from the side.

3. The anti-vibration rubber device according to claim 2, wherein the point line near the first connecting member is formed to vary in distance in the Z direction from the first connecting member and the point line near the second connecting member is formed to vary in distance in the Z direction from the second connecting member.

4. The anti-vibration rubber device according to claim 3, wherein a distance in the Z direction between said two point lines is at a minimum when viewed in the X direction and at a maximum when viewed in the Y direction.

5. The antivibration rubber device according to claim 2, wherein both of the point lines are concentrically arranged when viewed from a top.

6. The antivibration rubber device according to claim 2, wherein the height along the Z direction of each point line changes in the circumferential direction when viewed from the side.

7. The antivibration rubber device according to claims 1, 2, 5 or 6, wherein a plurality of fluid chambers are provided between the first and second connecting members and the elastic block is divided by a partition wall into said plurality of chambers, said chambers are filled with a fluid and adapted to communicate through an orifice passage.

8. An antivibration rubber device comprising:

a first connecting member having a first load receiving surface, said first connecting member being secured to one side of a vibrating member;

a second connecting member having a second load receiving surface which defines a substantially planar region, said second connecting member being secured to another side of the vibrating member;

an elastic block disposed between the first and second connecting members; and a ratio of a spring constant of said elastic block in each of two directions X and Y of input directions which are substantially perpendicular to a principal input direction Z and intersect at substantially right angles to each other being arranged to be greater than 1 relative to a spring constant in said Z direction; wherein in a load condition of a predetermined static load, said first load receiving surface of the first connecting member substantially intersects said planar region defined by the second load receiving surface of said second connecting member in the principal input direction Z when viewed from a side, and there is provided on one side of said second connecting member a flange which projects in the direction perpendicular to the direction Z, said second load receiving surface being defined by said flange; and the elastic block is integrally provided with a projecting portion to overlap the flange, wherein the projecting portion has a varied thickness.

9. The antivibration rubber device according to claim 8, wherein the elastic block is made to have a generally truncated cone shape when viewed from a side, an outer surface of the elastic block is formed to have a downwardly widening slope which has a changed inclination at inflection points formed in a circumferential direction, two point lines are formed by connecting the inflection points, said point lines are respectively formed continuously in a circumferential direction to have a generally round shape when viewed from a top of said elastic block and formed as a pair of lines at some distance on a position near to the first connecting member and on a position near to the second connecting member when viewed from the side.

10. The anti-vibration rubber device according to claim 9, wherein the point line near the first connecting member is formed to vary in distance in the Z direction from the first connecting member and the point line near the second connecting member is formed to vary in distance in the Z direction from the second connecting member.

11. The anti-vibration rubber device according to claim 10, wherein a distance in the Z direction between said two point lines is at a minimum when viewed in the X direction and at a maximum when viewed in the Y direction.

12. The antivibration rubber device according to claim 9, wherein both of the point lines are concentrically arranged when viewed from a top.

13. The antivibration rubber device according to claim 9, wherein the height along the Z direction of each point line changes in the circumferential direction when viewed from the side.

14. The antivibration rubber device according to claim 8, 9, 12 or 13, wherein a plurality of fluid chambers are provided between the first and second connecting members and the elastic block is divided by a partition wall into said plurality of chambers, said chambers are filled with a fluid and adapted to communicate through an orifice passage.

* * * * *